United States Patent [19]

Siroky

[11] 4,324,512
[45] Apr. 13, 1982

[54] PORTABLE DRILL WITH BUILT-IN CHUCK KEY

[76] Inventor: John A. Siroky, 809 Madiera, Shorewood, Ill. 60436

[21] Appl. No.: 135,705

[22] Filed: Mar. 31, 1980

[51] Int. Cl.³ .............................................. B23B 45/00
[52] U.S. Cl. ................................... 408/240; 81/90 A; 279/1 K; 408/241 R
[58] Field of Search ............... 408/240, 241; 279/1 K, 279/62; 81/90 A

[56] References Cited

U.S. PATENT DOCUMENTS

| | | | |
|---|---|---|---|
| 2,119,986 | 6/1938 | Dremel | 279/1 K X |
| 2,211,216 | 8/1940 | Oster | 279/1 K |
| 2,807,732 | 9/1957 | Kurtovich | 279/1 K |
| 3,728,038 | 4/1973 | Gage | 81/90 A |
| 3,872,951 | 3/1975 | Hastings, Jr. | 279/1 K X |

Primary Examiner—Z. R. Bilinsky
Attorney, Agent, or Firm—Dulin & Thienpont, Ltd.

[57] ABSTRACT

A power tool such as a drill, for example, including a modified Jacobs chuck and incorporating a chuck key permanently mounted in the power tool housing and a main shaft locking device for locking the main shaft when the chuck key is used to manipulate, i.e., open or close, the chuck and spring biasing means for normally retaining the main shaft locking device and the chuck key out of the operating position so that the tool can operate freely.

13 Claims, 9 Drawing Figures

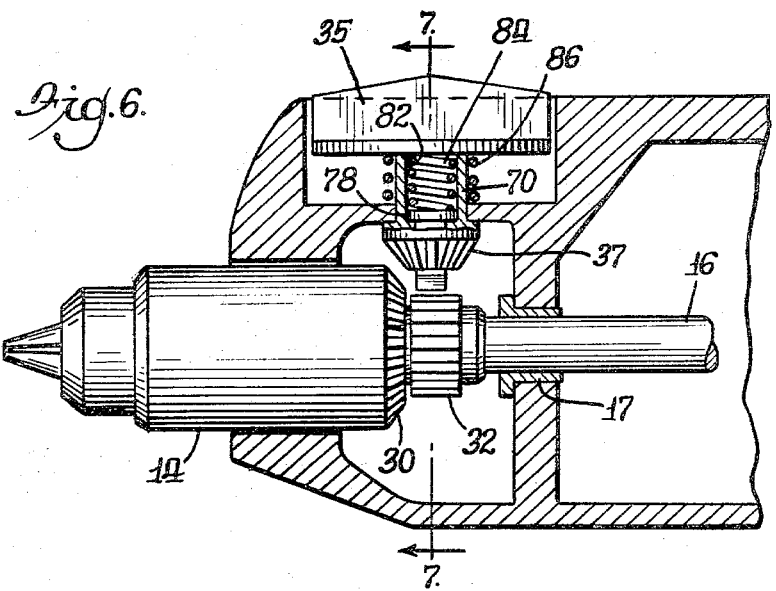
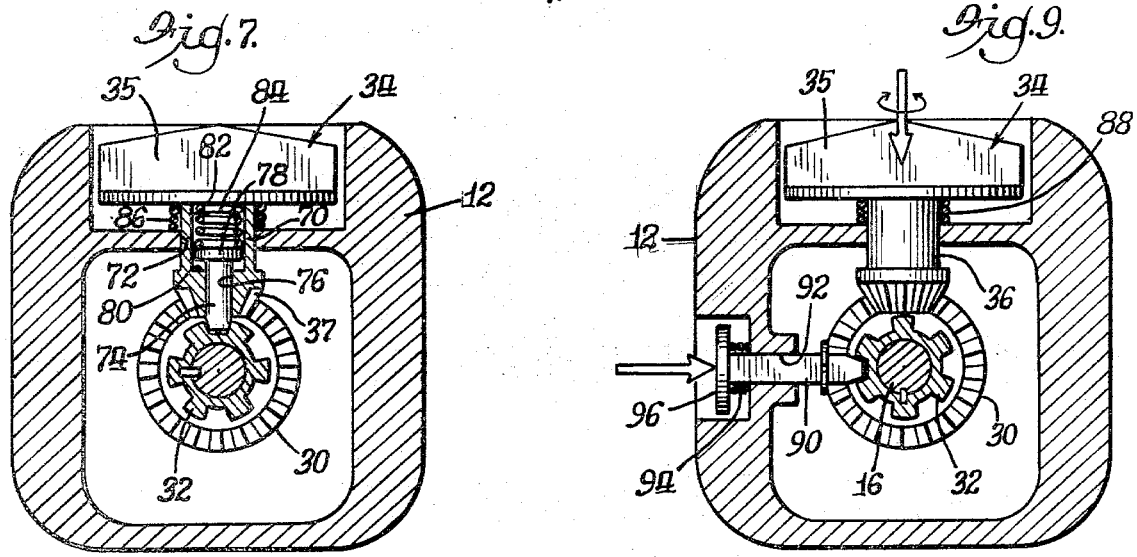
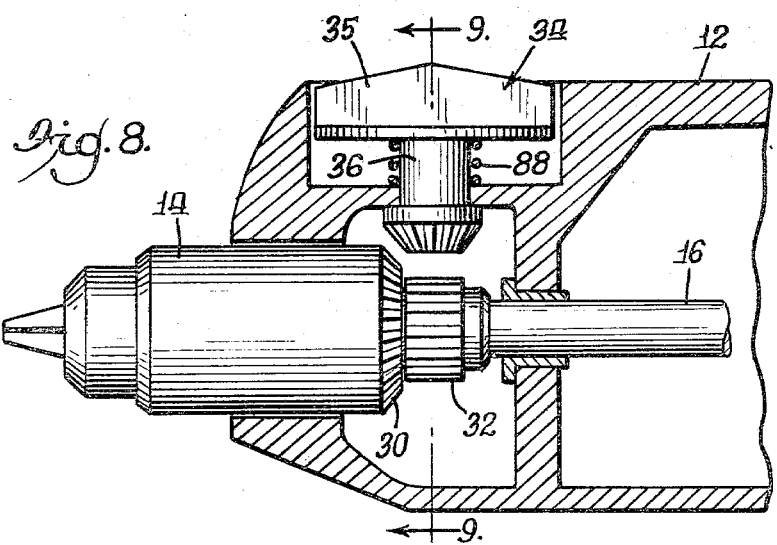

PORTABLE DRILL WITH BUILT-IN CHUCK KEY

BACKGROUND OF THE INVENTION

This invention relates to power tools such as an electric drill which includes a chuck device for retaining a tool such, for example, as a drill bit and more particularly to such a power tool which includes a built-in chuck key.

Anyone who has ever used a portable electric drill knows that the chuck key used to loosen or tighten the chuck jaws of the drill is easily lost or is often misplaced resulting in many obvious inconveniences. Various solutions to this problem have been used or suggested. The most obvious is to tie the chuck key to the electrical cord associated with the power tool with a piece of wire or string. The apparent disadvantages need not be belabored.

Several prior art patents have suggested solutions to this problem. The following are examples: U.S. Pat. Nos. 2,807,732 for Electric Drill with Built-In Chuck Key issued Sept. 24, 1957; U.S. Pat. No. 3,174,365 for Chuck Key Holder issued Mar. 23, 1965; U.S. Pat. No. 3,728,038 for Improved Chuck Key and Holder issued Apr. 17, 1973; and U.S. Pat. No. 3,947,924 for Chuck Key Storage Apparatus issued Apr. 6, 1976. With regard to the foregoing enumerated patents it will be observed that these proposed solutions all suffer from one or more deficiencies. In some it is the mode of operation, in others it is the construction which either suggests unwieldiness, lack of aesthetic appeal or perhaps even a somewhat unsafe construction. Accordingly it becomes appropriate to provide in conjunction with a power tool equipped with a Jacobs chuck or similar construction using a chuck key, a device which not only provides permanent integral storage for the chuck key but also does this in a manner which is a safe construction and still permits an overall aesthetically appealing complete tool even with a chuck key permanently attached.

SUMMARY OF THE INVENTION

It is, therefore, a principal object of this invention to provide in a power tool equipped with a chuck device such as a power drill a built-in chuck key which is internally disposed and permanently mounted in the tool housing.

Another object of this invention is to provide in a power tool a built-in chuck key which is spring biased to its normal non-use position.

Another object is to provide in a power tool a permanently mounted chuck key in combination with a main shaft locking device whereby manipulation of the chuck key will be effective first to lock the main shaft and then to operate the chuck.

Other objects and advantages of the invention will become more apparent from the following description and accompanying drawings.

BRIEF DESCRIPTION OF THE DRAWINGS

FIG. 6 is a partial side view in elevation and in section of a power drill showing a second embodiment of a built-in chuck key and shaft locking mechanism in a disengaged position;

FIG. 7 is an end view taken along line 7—7 of FIG. 6 showing the chuck key and shaft locking mechanism in an engaging position;

FIG. 8 is a partial side view in elevation and in section of a power drill showing a third embodiment of a built-in chuck key and shaft locking mechanism in a disengaged position; and FIG. 9 is an end view taken along line 9—9 of FIG. 8 showing the chuck key and shaft locking mechanism in an engaging position.

DESCRIPTION OF PREFERRED EMBODIMENTS

Figure 1:
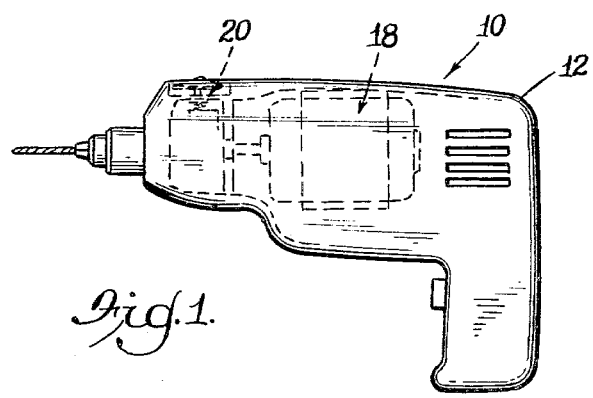
FIG. 1 is a side view in elevation of a power drill embodying the invention herein.

Turning now to the drawings wherein like reference characters in the several Figures denote similar parts, FIG. 1 shows generally an electric drill 10 of the type in which the invention herein may be incorporated. The drill 10 comprises a housing 12, modified Jacobs chuck 14, a motor gear train assembly 18 disposed within the housing 12 and drivingly connected to the shaft 16, a chuck key assembly 20 for opening or closing the chuck jaws and a main shaft locking mechanism 22.

Figure 3:
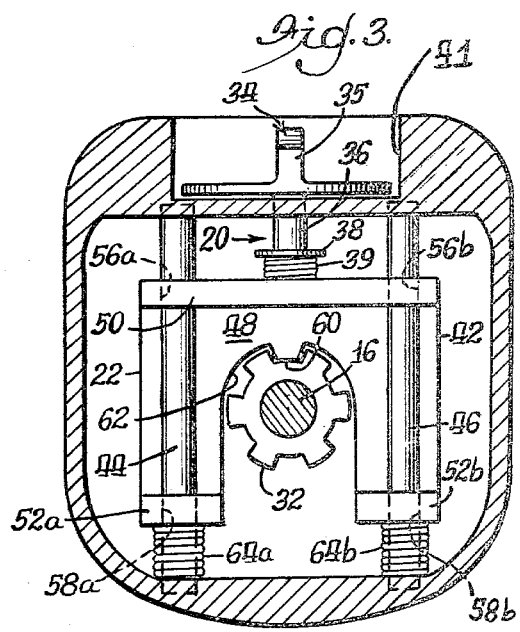
FIG. 3 is an end view taken along line 3—3 of FIG. 2 showing the shaft locking mechanism in an engaging position.
Figure 2:
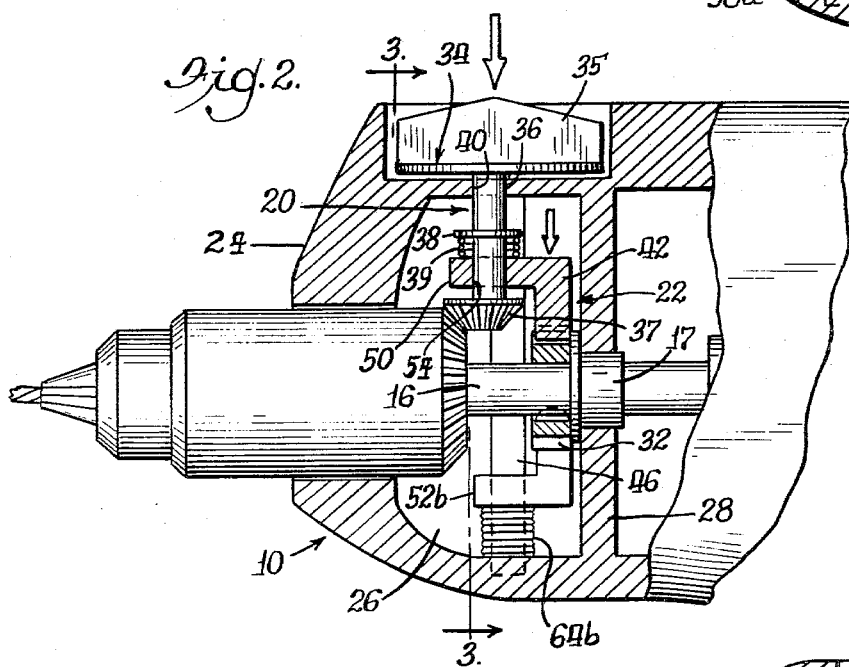
FIG. 2 is a partial side view in elevation and partially in section of a power drill of the type shown in FIG. 1 showing one embodiment of a built-in chuck key and a shaft locking mechanism in a shaft engaging position.
Figure 5:
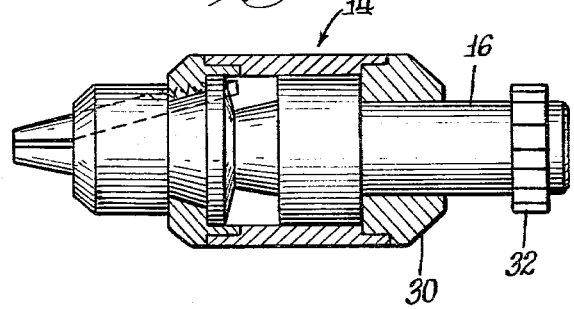
FIG. 5 is a side view partially in section of a chuck device of the type used in a drill as shown in FIG. 1.

In the embodiment shown in FIGS. 2 and 3 the housing 12 is constructed with a forward wall 24 through which the chuck 14 extends. The inner end of the chuck 14 extends into a cavity 26 formed in the housing 12 and defined in part by the forward wall 24 and a rear wall 28. A bevel gear 30 is formed on the inner end of the chuck 14. The outer end of main shaft 16 extends through rear wall 28 being rotatably supported therein by a main bearing 17. The main shaft 16 is connected to the motor gear train assembly 18 to be driven thereby, and the inner end of the main shaft 16 extends into the chuck 14. A locking gear 32 is formed on or secured to shaft 16.

The chuck key assembly 20 is permanently mounted in the housing 12 and comprises the chuck key 34 which includes a handle 35 stem 36 and bevel gear 37. The chuck key assembly further includes a spring retainer washer 38 formed on the stem 36 and a compression spring 39 disposed around the stem 36. The bevel gear 37 is adapted to engage the bevel gear 30 formed on the inner end of the chuck 14. The stem 36 slidably extends through a bore 40 in a wall portion of the housing 12.

The chuck key handle as here illustrated is an annular disc-like member with an upstanding flange. An annular recess 41 may be formed in the housing to accomodate the handle in an aesthetically appealing fashion.

Figure 4:
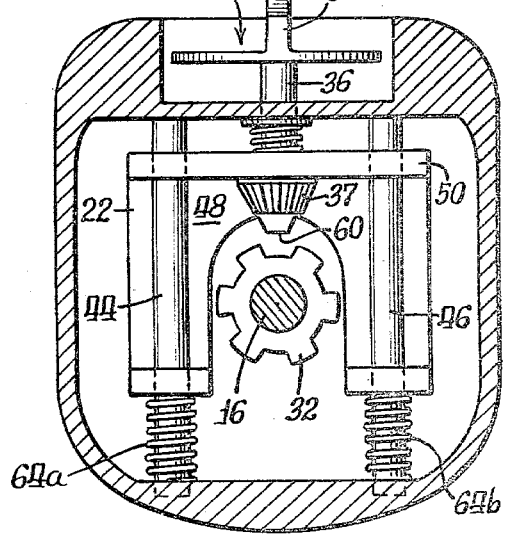
FIG. 4 is an end view similar to that shown in FIG. 3 but showing the shaft locking mechanism in a non-engaging position.

In the embodiment of FIGS. 2, 3 and 4 the main shaft locking mechanism 22 comprises an inverted generally U-shaped bracket member 42 slidably supported within the housing 12 on a pair of bearing rods 44 and 46 supported in the housing wall. The bracket member comprises a vertical plate-like portion 48, an upper flange 50 formed at a right angle to said plate-like portion 48 and a pair of lower flanges 52a, 52b also formed at right angles to said plate-like portion. The stem 36 of the chuck key slidably extends through a bore 54 in the upper flange. Bores 56a and 56b are formed in the upper flange 50 and bores 58a and 58b are formed in the lower flanges to receive the bearing rods 44 and 46 therethrough. The bracket member 42 is formed with a detent or projection 60 in the upper portion of a U-shaped cut-out 62 formed in the plate-like portion 48. The detent 60 is adapted to engage locking gear 32 to lock the main shaft when the chuck key is pushed downwardly as indicated by the arrow in FIG. 2. A pair of compression springs 64a and 64b are disposed around the bearing rods and under the flanges 52a and 52b and normally urge the bracket member 42 and detent 60 out of engagement with the locking gear 32 thus leaving the main shaft 16 free to rotate. Another compression spring 39 is disposed around the stem 36 of the chuck key between the upper side of the flange 50 and a spring retainer washer 38 fixed on the stem 36. This compression spring 39 is effective to normally urge the bevel gear 37 on the chuck key out of engagement with the bevel gear 30 on the rear end of the chuck. It will be apparent that when the chuck key is in its normal non-engaging position as shown in FIG. 4, and it becomes desirable to either loosen or tighten the chuck jaws all that is necessary is that the chuck key be pressed downwardly to a position as shown in FIGS. 2 and 3 and rotated as desired. In the course of manipulation the bracket member 42 will be moved downwardly by the force of the spring retainer 38 and spring 39 against the compression force of springs 64a, 64b to thereby effect engagement of detent 60 with locking gear 32 fixed to or formed on the main shaft to hold the main shaft against rotation. Further downward movement of the chuck key will bring the bevel gear 37 into engagement with bevel gear 30 on the rear end of chuck 14. Then the chuck key may be rotated either clockwise or counterclockwise, depending on whether the chuck jaws are to be opened or closed.

In the event that detent 60 and the trough of locking gear 32 are misaligned during initial operation of the chuck, the bevel gear 37 will still be engaged with bevel gear 30 on the rear end of chuck 14. As the chuck key 34 is depressed and rotated causing the chuck jaws to tighten around the desired tool bit, significant torsional force about the main shaft will be realized allowing rotation of the main shaft. As the main shaft is rotated and detent 60 and the trough of locking gear 32 come into alignment, the two will engage, locking the main shaft from further rotation due to the compressive force of spring 39 urging the bracket member 42 and detent 60 towards the trough of locking gear 32. When operation of the chuck jaws is completed the chuck key is released and the compression spring 39 will urge the chuck key upwardly out of engagement with the chuck and the springs 64a and 64b will urge the locking mechanism out of engagement with the locking gear.

FIGS. 6 and 7 show a second embodiment of the permanently internally mounted chuck key. In this embodiment the chuck key 34 is constructed with a tubular stem 70 depending from the handle 35. The tubular stem 70 is slidably disposed in opening 72 in the upper wall structure of the housing 12 and has formed on the end thereof bevel gear 37 which is adapted to engage the bevel gear 30 on the rear end of the chuck. A T-shaped locking pin 74 is slidably disposed in bore 76 of the stem 70. The upper end of the locking pin is formed with a slightly enlarged head 78 the outer edges of which are adapted to contact the shoulder 80 of enlarged bore 82 of the stem 70 to retain the locking pin in the stem. A compression spring 84 in the bore normally urges the locking pin downwardly. Another compression spring 86 surrounds the stem 70 and is disposed between the upper side of the wall structure of the housing 12 and the lower face of the plate-like portion of the handle. The spring 86 is effective to normally urge the chuck key out of engagement with the chuck. Here again starting from the position of non-engagement, if it becomes desirable to loosen or tighten the chuck jaws the handle 35 is pressed downwardly and the compression spring 84 within the tubular stem will urge the locking pin 74 into engagement with the locking gear 32 secured on the main shaft 16 and as the handle 35 is pressed downwardly still further the bevel gear 37 on the stem 70 of the chuck key will engage the bevel gear 30 on the rear of the chuck. With the locking pin 74 in engagement with the locking gear 32 the rear chuck gear 30 can be rotated in either direction while the main shaft and chuck core are maintained stationary.

In the event that locking pin 74 and locking gear 32 are misaligned during initial operation of the chuck, the bevel gear 37 on stem 70 of the chuck key will still engage with bevel gear 30 on rear end of chuck 14. As the handle 35 is depressed and rotated causing the chuck jaws to tighten around the desired tool bit, significant torsional force about the main shaft will be realized allowing rotation of the main shaft. As the main shaft rotates and locking pin 74 and the trough of locking gear 32 come into alignment, the two will engage locking the main shaft from further rotation due to the compressive force of spring 84 urging the locking pin 74 towards the trough of locking gear 32. Release of the handle 35 will permit the compression springs 84 and 86 to urge the chuck key 34 and locking pin 74 back to non-engaging positions as shown in FIG. 6.

A third embodiment is illustrated in FIGS. 9 and 10. In this embodiment the chuck key is permanently mounted in the housing, but the locking mechanism is mounted separately in the housing away from the chuck key and is here shown as being displaced approximately 90 degrees from the chuck key itself. With this embodiment it becomes necessary to use two hands to manipulate the chuck jaws as distinguished from the activity required in connection with the first two embodiments. In the embodiment of FIGS. 9 and 10 the chuck key 34 also is slidably supported in a wall portion of the housing 12. A compression spring 88 normally urges the chuck key out of engagement with the bevel gear 30 on the rear end of the chuck. Such compression spring 88 is here shown as surrounding the stem 36 and disposed between the housing wall and the handle 35. FIG. 9 illustrates a locking pin 90 slidably supported in a bore 92 in the housing 12. A compression spring 94 disposed about the locking pin 90 between the housing wall and a button 96 on the outer end of the locking pin normally urges the locking pin to a position in which it does not engage the locking gear 32. To lock the main shaft 16 the locking pin 90 is pushed inwardly from left to right against the pressure of spring 94 to a position of engagement with the locking gear 32 to secure the main shaft against rotation. Then the chuck key 34 may be pressed downwardly against the pressure of spring 88 to engage the bevel gear 30 at the rear of the chuck to tighten or loosen the chuck jaws. Release of the chuck key handle and the locking pin operating button, of course, permits both the chuck key and locking pin to return to their normal non-engaging positions.

Although the idea of a permanently mounted chuck key has been illustrated here in connection with a hand drill it should be apparent that this idea may be incorporated in other types of tools which normally use a separate chuck key to manipulate the jaws of a tool carrying chuck.

It will be apparent that I have advantageously provided in a portable electric tool a means for incorporating permanently into the tool housing a chuck key to thereby do away with the inconveniences common to the use of such articles when chuck keys are separate items.

While certain preferred embodiments of the invention have been disclosed, it will be appreciated that these are shown by way of example only, and the invention is not to be limited thereto as other variations will be apparent to those skilled in the art and the invention is to be given its fullest possible interpretation within the terms of the following claims.

What is claimed is:

1. In a power drill including a chuck for holding a working tool the combination comprising:
   a housing;
   a motor-driven main shaft mounted in said housing for rotation by a driving motor;
   a main shaft locking mechanism disposed within said housing for engaging said main shaft to selectively lock the main shaft;
   a chuck key permanently slidably mounted in said housing and engageable with the chuck, said chuck key being moveable in said housing between an operating and a nonoperating position;
   spring biasing means for normally retaining said main shaft locking mechanism and said chuck in a non-operating position; said main shaft locking mechanism including
   an inverted substantially U-shaped bracket member slidably supported within said housing and straddling said main shaft;
   a pair of bearing support rods disposed within the housing on each side of said main shaft for slidably supporting said U-shaped bracket member, and
   means formed on said U-shaped bracket member for lockingly engaging said main shaft.

2. The power drill of claim 1 wherein said biasing means includes
   first spring means for normally urging said chuck key out of engagement with said chuck, and
   second spring means for normally urging said main shaft locking mechanism out of engagement with said main shaft.

3. The power drill of claim 1 including
   a locking gear secured on said main shaft, and
   means formed on said main shaft locking mechanism for engaging said locking gear to prevent rotation of said main shaft.

4. The power drill of claim 3 wherein
   said means for engaging said locking gear on said main shaft comprises a spring biased member operatively associated with said chuck key and moveable to a shaft engaging position by manipulation of said chuck key.

5. The power drill of claim 1 including
   detent means formed on said U-shaped bracket member for engaging said main shaft.

6. The power drill of claim 1 including
   spring biasing means associated with said bracket member disposed so as to normally urge said bracket member out of engagement with the main shaft.

7. The power drill of claim 1 wherein
   said chuck key is slidably mounted in said housing and slidably extends through said U-shaped bracket member.

8. The power drill of claim 1 wherein
   said chuck key is operable to actuate said means on said main shaft locking mechanism for engaging said locking gear fixed to said main shaft.

9. In a power drill including a chuck for holding a working tool the combination comprising:
   a housing;
   a motor-driven main shaft mounted in said housing for rotation by a driving motor;
   a main shaft locking mechanism disposed within said housing for engaging said main shaft to selectively lock said main shaft;
   a chuck key permanently slidably mounted in said housing and engageable with the chuck, said chuck key being movable in said housing between an operating and a nonoperating position;
   spring biasing means for normally retaining said main shaft locking mechanism and said chuck key in a nonoperating position;
   said chuck key being formed with a tubular portion and a handle portion said tubular portion depending from said handle portion and extending through a wall portion in said housing;
   said biasing means including a compression spring member extending between a portion of said housing and said handle portion for urging said chuck key out of engagement with said chuck,
   said locking mechanism including a locking pin slidably disposed within said chuck key, and a spring disposed within said tubular portion for urging said locking pin into locking engagement with said main shaft.

10. The power drill of claim 9 wherein
    said chuck key and said locking pin are concentrically mounted with respect to each other.

11. In a power tool including a chuck for holding a working tool the combination comprising:
    a housing;
    a motor-driven main shaft mounted in said housing for rotation by a driving motor;
    a main shaft locking mechanism disposed within said housing for engaging said main shaft to selectively lock said main shaft;
    a chuck key permanently slidably mounted in said housing and engageable with the chuck, said chuck key being movable in said housing between an operating and a nonoperating position;
    means mounted within said housing for securing said main shaft against rotation when said chuck key is being operated;
    means associated with said chuck key and said securing means for retaining them in a nonoperable position during normal operation of the tool;
    said main shaft locking mechanism including
    an inverted substantially U-shaped bracket member slidably supported within said housing and straddling said main shaft,
    a pair of bearing support rods disposed within the housing on each side of said main shaft for slidably supporting said U-shaped bracket member, and means formed on said U-shaped bracket member for lockingly engaging said main shaft.

12. In a power tool including a chuck for holding a working tool the combination comprising:
a housing;
a motor-driven main shaft mounted in said housing for rotation by a driving motor;
a main shaft locking mechanism disposed within said housing for engaging said main shaft to selectively lock the main shaft;
a chuck key permanently slidably mounted in said housing and engageable with the chuck, said chuck key being movable in said housing between an operating and a nonoperating position;
spring biasing means for normally retaining said main shaft locking mechanism and said chuck key in a nonoperating position;
said chuck key being formed with a tubular portion and a handle portion said tubular portion depending from said handle portion and extending through a wall portion in said housing;
said biasing means including a compression spring member extending between a portion of said housing and said handle portion for urging said chuck key out of engagement with said chuck,
said locking mechanism including a locking pin slidably disposed within said chuck key, and a spring disposed within said tubular portion for urging said locking pin into locking engagement with said main shaft.

13. The power tool of claim 12 wherein said spring biasing means includes
first spring means operatively associated with said chuck key for normally urging said chuck key out of engagement with the chuck, and
second spring means operatively associated with said main shaft locking mechanism for normally urging said main shaft locking mechanism out of engagement with said main shaft.

* * * * *